(12) United States Patent
Mughal et al.

(10) Patent No.: US 7,509,021 B2
(45) Date of Patent: Mar. 24, 2009

(54) METHOD AND SYSTEM FOR PROVIDING INSTANT REPLAY

(75) Inventors: Mushtaq Ahmad Mughal, Islamabad (PK); Adnan Obaid, Islamabad (PK); Haroon-ur Rashid, Islamabad (PK)

(73) Assignee: Streaming Networks (Pvt.) Ltd., Islamabad (PK)

( * ) Notice: Subject to any disclaimer, the term of this patent is extended or adjusted under 35 U.S.C. 154(b) by 757 days.

(21) Appl. No.: 11/167,547

(22) Filed: Jun. 27, 2005

(65) Prior Publication Data
US 2006/0291817 A1    Dec. 28, 2006

(51) Int. Cl.
*H04N 5/76*    (2006.01)
*H04N 7/26*    (2006.01)

(52) U.S. Cl. ........................... 386/68; 386/109
(58) Field of Classification Search ............ 386/1, 386/45–46, 68–70, 125–126
See application file for complete search history.

(56) References Cited

U.S. PATENT DOCUMENTS

| | | | |
|---|---|---|---|
| 5,621,473 A | | 4/1997 | Hill |
| 6,236,805 B1 * | | 5/2001 | Sebestyen .................. 386/98 |
| 6,477,313 B1 * | | 11/2002 | Itoi ............................. 386/52 |
| 2003/0177292 A1 | | 9/2003 | Smirnov et al. |
| 2003/0219227 A1 | | 11/2003 | Otala et al. |

OTHER PUBLICATIONS

Streaming Networks, Application No.: 06 785 760.7-1522, EP Examination Report, Aug. 20, 2008, 11pp.

* cited by examiner

*Primary Examiner*—Thai Tran
*Assistant Examiner*—Nigar Chowdhury
(74) *Attorney, Agent, or Firm*—Sonnenschein Nath & Rosenthal LLP

(57) ABSTRACT

A method for providing instant replay is disclosed, including receiving a video and an audio stream from a source. Each media unit includes at least one video frame and at least one or more corresponding audio frames which further includes a first video frame that is independently decodable. Each media unit is an independently decodable entity. The media units have a fixed duration. The media units are stored in a memory. A number of starting addresses are stored in a table. The sequence header is retrieved in response to receipt of an instant replay command. Appropriate video and audio decompression engines are selected and configured based on the retrieved sequence header. An instant replay starting address is identified from the table in response to receipt of the instant replay command. One or more media units are retrieved from the memory starting with the media unit associated with the instant replay starting address.

24 Claims, 6 Drawing Sheets

$$V_{I1}A_1A_1A_1\ldots V_{P2}A_2A_2A_2\ldots V_{P3}A_3A_3A_3\ldots \ldots \ldots V_{P30}A_{30}A_{30}A_{30}\ldots \| V_{I31}A_{31}A_{31}A_{31}\ldots$$

FIG. 2

At the video compression engine input order of video frames:

Start of Media Unit (MU1)

Start of MU2
End of MU1

Start of MU3
End of MU2

At the video compression engine output order of coded video frames:

Start of MU1

Start of MU2
End of MU1

Start of MU3
End of MU2

METHOD AND SYSTEM FOR PROVIDING INSTANT REPLAY

BACKGROUND

1. Field

The present invention generally relates to multi-media program viewing, and more specifically, to providing an instant replay function during multi-media program viewing.

2. Background

Digital video recorders (DVRs), personal video recorders (PVRs), DVD players, set-top boxes (STBs) and other similar consumer electronic devices, collectively (CE) devices, provide so called trick modes to allow a viewer to navigate recorded audio/video contents during playback. Traditional trick modes include forward, reverse and slow motion, etc. at various speeds. These trick modes are analogous to ones that are available in analog devices like the VCRs (video cassette recorders). Due to the digital nature of the video and audio data stored and processed in present CE devices, additional trick modes, such as, instant replay and skip functionality and others are now also available together with the traditional ones.

Instant replay lets the viewer watch an incoming video segment once or repeatedly. Such feature is useful and desirable, especially for sporting and entertainment events.

A number of mechanisms have been proposed to implement instant replay. In one system, the instant replay is shown in PIP (picture-in-picture) thereby reducing the resolution considerably. This may limit the quality and view-ability of the video clip that the user may want to watch closely again. In other systems, the mechanisms involve complex circuitry.

Hence, it would be desirable to provide methods and systems that are capable of providing instant replay in a more efficient manner.

SUMMARY

In one embodiment, while live audio/video (A/V) signals are being received and displayed, such signals are also being digitized, compressed and recorded in the background. The recently recorded information is used for subsequent instant replay or playback of certain A/V segment(s). The A/V segments may include, for example, a goal just scored in a soccer game, a swing in a golf game or any particular scene which the viewer would like to see again either once or repeatedly. The recording can be done in a memory, such as, a fixed (e.g., DRAM) or removable media (e.g., compact flash, memory stick, USB flash drives, micro drives, etc.) or hard disk or any other similar randomly accessible storage mediums. The allocated memory is used in a cyclic manner such that the latest recorded materials are always available for instant replay. The present invention can be used in television units, satellite and terrestrial STBs, PVRs, DVRs and other similar devices.

The A/V signals in digital form are compressed by video and audio compression engines, multiplexed and grouped into so called "media units", thereby providing random access to an A/V sequence. A media unit is an independently decodable entity similar to group of pictures (GOPs) in a video sequence and includes a multiplexed A/V stream. The first frame of a multiplexed media unit is always an independently decodable video frame. Each video frame is followed by its corresponding audio frame(s). Each media unit also is of fixed time duration, typically around one (1) second. The video sequence in a media unit can be made up of Intra-predicted (I) frames only, I-frames and inter-predicted (P) video frames or I, P and bi-directionally predicted (B) video frames, as long as the media units are independently decodable quantities.

The time duration of instant replay in response to a user command (i.e., the amount of playback) is configurable and may be set to a multiple of media units. The setting can vary from a minimum of one (1) media unit to a maximum of the nearest integer multiple of media units occupying the total memory allocated for instant replay function. Typically, a setting of five (5) to ten (10) media units is used.

After the multiplexing stage of the video and audio sequence is performed, a controller is used to form media units and to generate a table to maintain the address of each media unit in the storage media. The starting address in the table is subsequently used to jump to a selected media unit to start the playback of the stored multiplexed video and audio sequence for the instant replay.

The live A/V signals can be viewed in PIP along with the instant replay on full screen, thereby allowing the user to concurrently view the current segment of the program being broadcasted. Alternatively, the instant replay may be shown in PIP with the live A/V signals on full screen. The instant replay and the live A/V signals may be toggled between PIP and full screen.

In another embodiment, a controller forms logical media units and generates a table of logical media units starting addresses to provide instant replay function for an already recorded media stream. This can be done while the media stream is being de-multiplexed. In this case, only decoding circuitry is used.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein:

FIG. 2 is a simplified schematic diagram illustrating a single media unit audio/video sequence;

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

One or more embodiments of the present invention will now be described. The present invention describes a simple and memory efficient method for providing instant replay. In one embodiment, information stored during compression and multiplexing of audio/video signals is used to invoke the instant replay function. In another embodiment, if an existing audio/video stream is selected for playback, the information to be used to invoke the instant replay function is generated while the file for playback is being demultiplexed.

Figure 1:
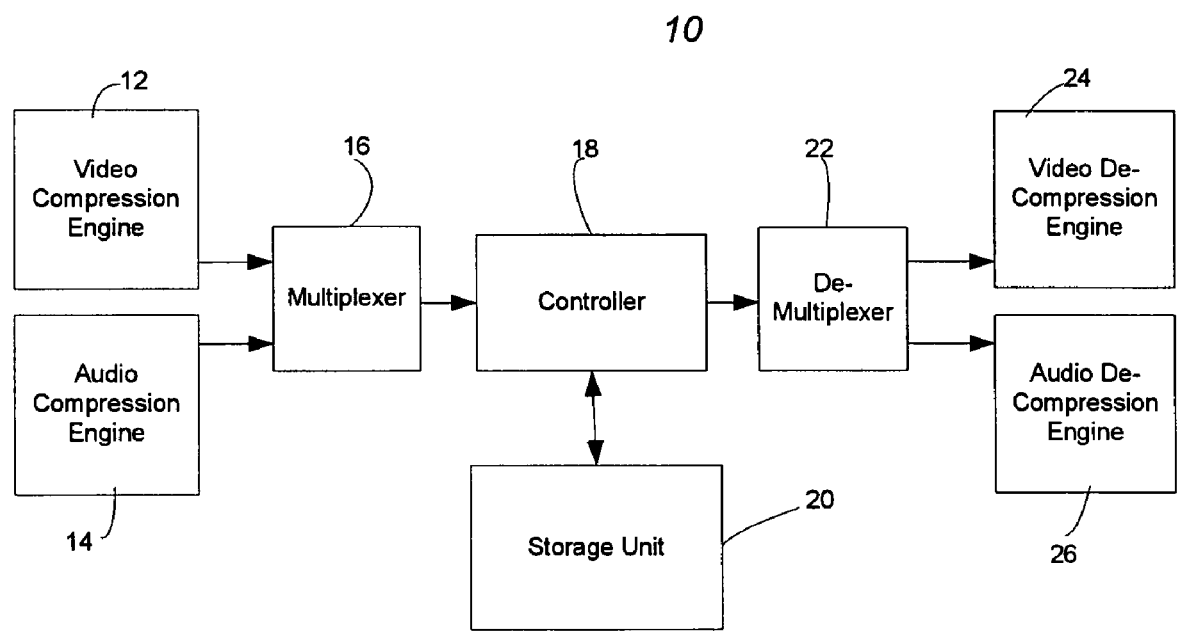
FIG. 1 is a simplified schematic diagram illustrating one embodiment of the present invention.

FIG. 1 illustrates one embodiment of the present invention. In one embodiment, the system 10 includes a video compression engine 12, an audio compression engine 14, a multiplexer 16, a controller 18, a storage unit 20, a demultiplexer 22, a video decompression engine 24, and an audio decompression engine 26. It should be noted that some commonly understood components, such as, A/D converters etc., that may be used to implement the present invention are not shown. It is assumed that input digital audio/video (A/V) data for the video and audio compression engines 12 and 14 may be obtained by digitizing A/V signals from any one of a number of A/V sources, such as turners in television tuners, satellite and terrestrial STBs or any other similar devices.

The input digital A/V data is provided to the respective video compression engine 12 and audio compression engine 14. Output from the video and audio compression engines 12 and 14 are then multiplexed by the multiplexer 16. Output from the multiplexer 16, in turn, is stored in the storage unit 20.

The video compression and decompression engines 12 and 24 can be compliant with any of the video standards, such as, ITU/ISO H.261, H.263, MPEG1, MPEG2, MPEG4, H.264 and MJPEG etc.

The audio compression and decompression engines 14 and 26 can be compliant with any of the audio standards, such as, the G.7xx series, MPEG Layer I, II and III, AAC, AC3, etc.

A sequence header for an incoming data stream is saved separately for use during the playback phase, as will be further described below. The sequence header includes information on the characteristics of the compressed video and audio data streams and the video and audio compression engines 12 and 14. The sequence header is stored because such header is only available at the start of the data stream and may be overwritten as the storage unit 20 is used in a circular fashion as will be further described below.

The multiplexer 16 performs the following multiplexing scheme. Compressed video frame(s) and corresponding compressed audio frame(s) are stored along with their respective time-stamp information. The time-stamp information is later used for A/V synchronization. A video frame is followed by its corresponding audio frame(s). The controller 18 stores the multiplexed video and audio data in what is termed here as a "media unit", along with the starting addresses of the media units in a table. Each media unit (MU) is formed to be an independently decodable entity.

The first compressed video frame of a media unit is an independently decompressible frame, i.e., the decompression of the frame does not depend on any previously compressed frame(s) or future compressed frame(s). This makes the system 10 valid for use with any compression engines and independent of the types of sequence of compressed video frames. MPEG type compression engines will be used to explain the method performed by the system 10.

A media unit may include a sequence of only I-frames with its associated audio frame(s), or I- and P-frames each with its associated audio frame(s), or I-, P- and B-frames each with its associated audio frame(s). An example for an I-, P- and B-video sequence is shown below.

FIG. 2 shows a sequence stored in a single media unit. The sequence includes thirty (30) I- and P-frames starting with an I-frame and ending with a P-frame. "‖" shows the end of a media unit. $V_{f1}$ corresponds to a video I-frame and $A_1 A_1 A_1 \ldots$ is the corresponding audio frames for the duration of the video I-frame $V_{f1}$.

The media unit sequence shown in FIG. 2 for NTSC video format will result in a one-second duration media unit. For a PAL system, twenty-five (25) frames will form a one-second duration media unit. It should be noted that there is no restriction as to the number of frames that may be included in a single media unit. In one implementation, suitable time duration for a media unit may be one (1) second or half a second. It should be further noted that the starting video frame in a media unit is an independently decodable frame, such as, an I-frame. For an MPEG type compression engine, this is achieved by configuring the encoder to insert an I frame after thirty (30) frames in case of the NTSC video format and twenty-five (25) frames in case of the PAL video format if each media unit is to be of one-second duration.

Referring back to FIG. 1, the video compression engine 12, possibly of MPEG type, compresses the video data as I-frames at appropriate instances depending on the time duration setting of a media unit. The audio compression engine 14 compresses the digital audio data. The compressed video and audio frames are then multiplexed by the multiplexer 16. The timing information relating to the video and audio frames is stored in a header. The timing information is to be used subsequently for A/V synchronization function. The header precedes the multiplexed video and audio frames. The multiplexed data is grouped by the controller 18 as media units such that each media unit is of a fixed duration (e.g., one (1) second) and is independently decodable. These media units are then stored in the storage unit 20. The starting addresses of the media units are also stored in a table in the storage unit 20. The storage unit 20 may include a DRAM (dynamic random access memory) or any other, randomly accessible, semiconductor-based or magnetic-media-based memory.

Figure 3:
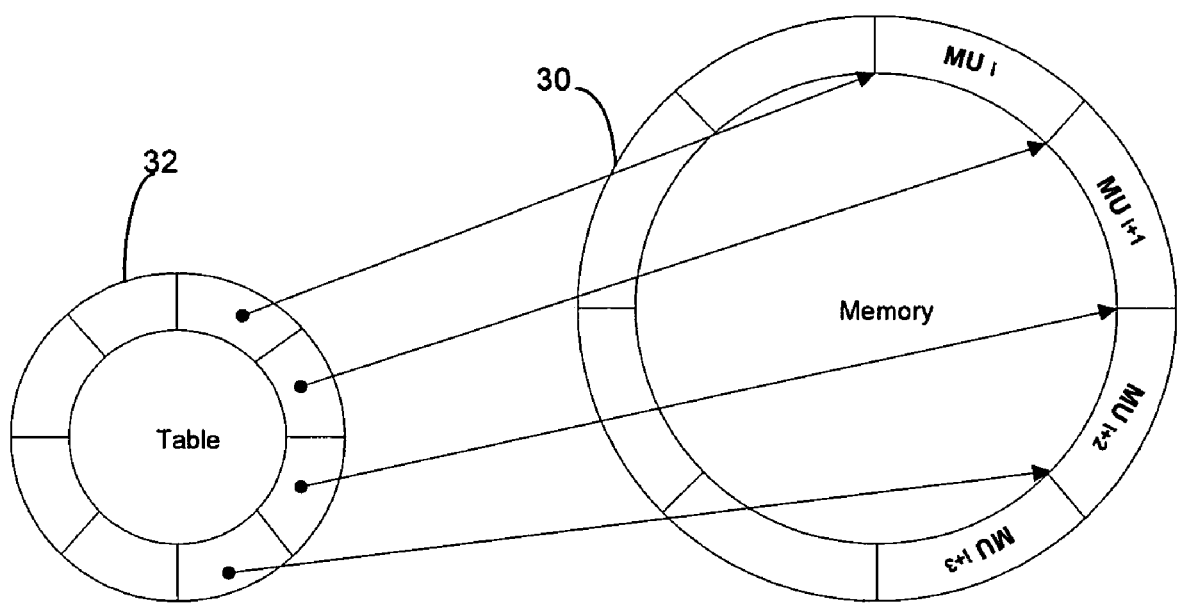
FIG. 3 is a simplified schematic diagram illustrating an association between a table and a media storage unit during a recording phase according to the present invention.

The table that is used to store the starting addresses for the media units can be implemented as an array or any other suitable data structure. The size of the table is chosen such that it is slightly larger than the number of media units that can be stored in the memory allocated, as will be further described below. As shown in FIG. 3, the memory 30 in which the media units are stored is used as a circular buffer. The media units are written to the memory 30 sequentially. When the end of the memory 30 is reached, the oldest media units are overwritten by the most recent ones. Similarly, the table 32 is also used in a circular fashion such that oldest media unit starting addresses are overwritten by the current ones once the end of the table 32 is reached. As can be seen in FIG. 3, there is an one-to-one association or mapping between the entries (media unit starting addresses) in the table 32 and the media units stored in memory 30.

The system 10 can be used for both constant bit rate (CBR) and variable bit rate (VBR) A/V streams. Referring to FIG. 3, an one-to-one mapping is kept between the table 32 and memory 30 where the media units are stored. The size of the table 32 is based on the instant replay time window requirements and media unit/second setting. The table 32 is usually kept slightly larger than required, since practically even in the CBR case, the resulting multiplexed data is not always exact. However, as soon as the memory 30 where media units are stored rolls over (i.e., the oldest media unit is overwritten), the oldest media unit starting address is also overwritten even if the table 32 is not fully used yet. The size of memory 30 allocated for media unit storage may be based on peak bit-rate assumption and instant replay time window requirements.

A device typically allows a user to issue an instant replay command either by pressing a remote control, keyboard or any other input device key. A single press of the instant replay function key directs the device to reverse and play back the recently viewed segment by a predetermined amount as represented by "X" media units, where X may be variable and is typically set to between five (5) and ten (10). A single media unit typically has time duration of one (1) second. A second press of the instant replay function key directs the device to go back another X media units from the current position. Successive pressing of the instant replay function key will direct the device to go back multiples of X media units till the beginning (as the A/V sequence is traversed backwards) of the memory 30 is reached. The value of X is configurable. Such configurability may be used to accommodate the type of programs being watched. For example, for some sporting events, a value often (10) on a single press would let the user go very near to where replay should start from.

Figure 4:
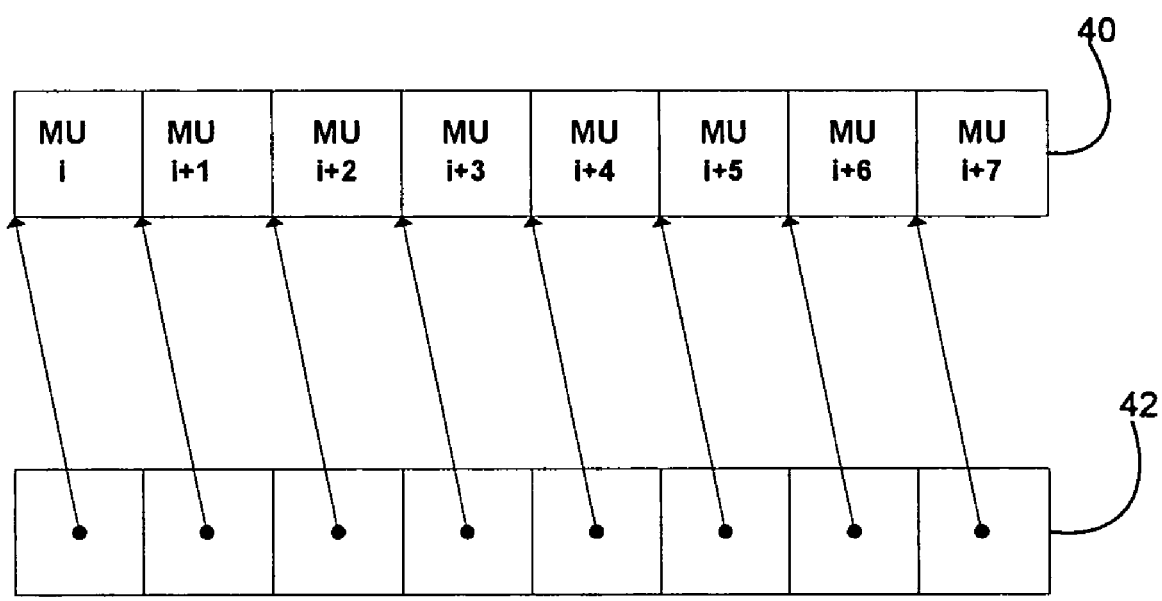
FIG. 4 is a simplified schematic diagram illustrating an association between a table and a media storage unit during a playback phase according to the present invention.

During playback, the memory 40 and the corresponding table 42 are traversed in a linear fashion as depicted in FIG. 4. Playback typically starts from the oldest media unit stored.

The sequence header information saved during the recording phase is read by the demultiplexer 22. The sequence header information is used to select the appropriate video decompression engine 24 (MPEG4, H264, etc.) and audio decompression engine 26. The sequence header information is read every time the instant replay is requested since it is possible that the compression engine settings have been changed to achieve longer play-time by reducing the bit rate or the resolution of video being recorded. The sequence header information is also passed to the selected decompression engines 24 and 26, so as to allow the selected decompression engines 24 and 26 to configure themselves.

Referring to FIGS. 1 and 3, the controller 18 computes and fetches the media unit starting address from the table 32 where the playback is to start for the instant replay. A jump is made to that location in the memory 30 in the storage unit 20 to start reading the media units and present such media units to the demultiplexer 22. The demultiplexer 22 separates the media units into video and audio data and presents the data to the respective decompression engine 24 and 26 along with the respective time stamps for A/V synchronization. The video and audio data are decoded by the respective decompression engines 24 and 26. Media units are read out from the memory 30 until the most recently recorded media unit is reached.

The live A/V signals can be viewed in PIP along with the instant replay on full screen, thereby allowing the user to concurrently view the current segment being broadcasted. Alternatively, the instant replay may be shown in PIP while the live A/V signals may be viewed on full screen.

In another embodiment, the instant replay function can be provided for A/V media not being broadcasted live but being played from files on local or network storage devices such as hard disks, CDs, DVDs, flash cards and other similar storage devices. These files may be in multiplexed compressed form.

Figure 5:
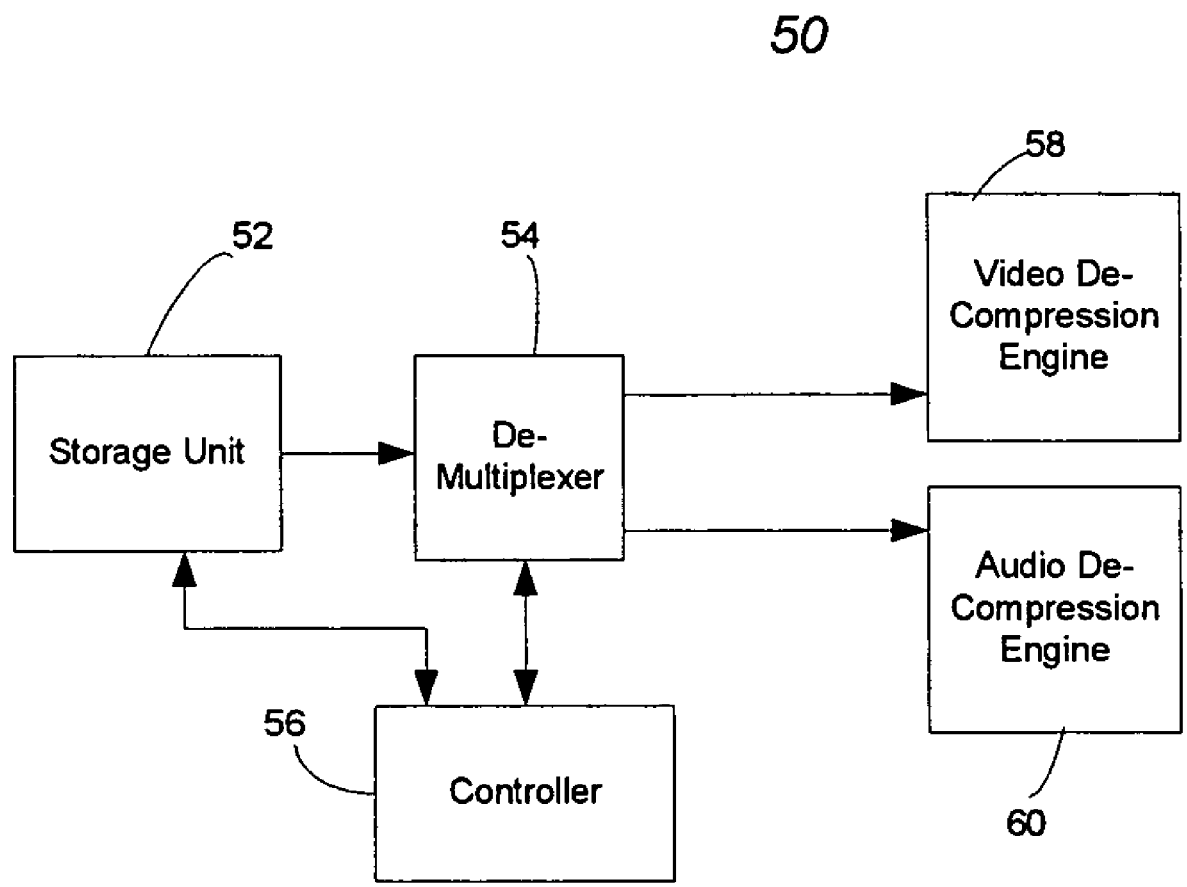
FIG. 5 is a simplified schematic diagram illustrating another embodiment of the present invention.

Referring to FIG. 5, in another embodiment, the system 50 includes a storage device 52, a demultiplexer 54, a controller 56, a video decompression engine 58 and an audio decompression engine 60. A file is read from the storage device 52. While being decompressed and displayed, media units are also being logically formed based on the file contents and processed by the controller 56 in cooperation with the demultiplexer 24 to build a table with starting addresses of logical media units. The time duration of each logical media unit may vary depending on the setting of the compression engine used for encoding. Consequently, the timing information of each logical media unit is also saved by the controller 56 in the table along with the corresponding starting address. The timing information is the rendering time-stamp of the first video frame in the media unit. The starting addresses are subsequently used to decide the location from which to start the instant replay.

The controller 56 saves the starting address of each logical media unit in a table such that the first video frame of the output stream is an independently decompressible frame, such as, an I-frame.

The instant replay command is issued by a user either by remote control, keyboard or any other input device. Referring to FIG. 5, the controller 56 computes and fetches the starting address from the table. The starting address indicates the location where the playback is to start for the instant replay. A jump is made to that location in the storage unit 52 to start reading the media units and present them to the demultiplexer 54. The demultiplexer 54 separates the video and audio data and presents such data to the video and audio decompression engines 58 and 60 along with the respective time-stamps for A/V synchronization. The video and audio data are decoded by the decompression engines 58 and 60. Media units are read from the storage unit 52 and rendered until the most recently read media unit of the file is reached.

The following is an illustrative example. For media units with a video sequence having only I- and P-frames, as shown in FIG. 2, it is clear that each media unit is independently decodable. After the starting I-frame, each subsequent I-frame indicates the end of a previous media unit and start of the next media unit.

Figure 6:
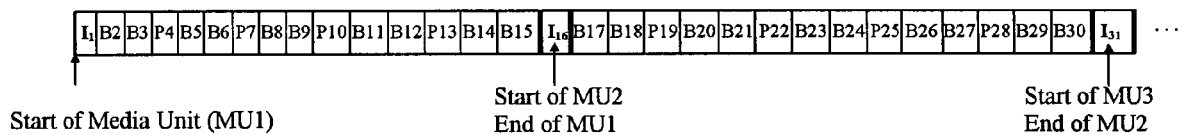
FIG. 6 is a simplified schematic diagram illustrating a general case of I, P, B video sequence of two (2) media units of half second each for NTSC video format.
Figure 6:
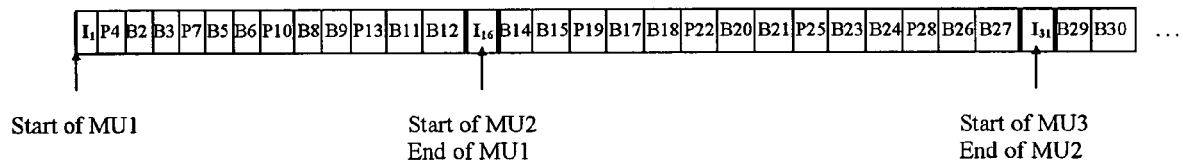

The following is another illustrative example. Media units with a video sequence having I-, P- and B-frames are played back as follows. A typical video sequence having I-, P- and B-frames at the compression engine input and output is shown in FIG. 6. As an example, a media unit includes fifteen (15) frames, i.e., the duration of half a second for an NTSC video format is shown. For purposes of simplicity herein, audio frames of media units are not shown.

In this case when a jump is made, pursuant to the instant replay function, to the beginning of the data stream, there are no B-frames following the I-frame ($I_1$) of the very first media unit. However, in general after every I-frame (which signifies the end of a previous media unit and the start of a new media unit), two (2) B-frames follow which belong to the previous media unit. In the sequence shown, B and B belong to the first media unit and B and B belong to the second media unit.

Hence, upon locating the starting address of the media unit, in order to start the instant replay, the next two (2) frames are ignored, if these are B-frames. Similarly, when the playback reaches an I-frame, which signifies the start of the next media unit (and the end of a previous media unit), decoding continues for the next two (2) frames, if these are B-frames, in order to complete processing of the entire previous media unit.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A method for providing instant replay, the method comprising:
   receiving a video stream and an audio stream;
   playing a program in real time, wherein the program is rendered from the video and audio streams;
   compressing the video stream and the audio stream using a video compression engine and an audio compression engine respectively;
   storing information relating to the compressed video and audio streams and the video and audio compression engines in a sequence header;
   multiplexing the compressed video and audio streams along with synchronization information to form a plurality of coded audio and video frames;
   forming a plurality of media units, wherein each media unit includes at least one video frame and at least one or more corresponding audio frames, wherein each media unit includes a first video frame that is independently decodable, wherein each media unit is an independently decodable entity, and wherein the plurality of media units have a fixed duration;
   storing the plurality of media units in a memory;
   storing a plurality of starting addresses in a table, wherein each of the plurality of starting addresses corresponds to one of the plurality of media units;
   retrieving the sequence header in response to receipt of an instant replay command;
   selecting and configuring appropriate video and audio decompression engines based on the retrieved sequence header;
   identifying an instant replay starting address from the table in response to receipt of the instant replay command;
   retrieving one or more of the plurality of media units from the memory starting with the media unit associated with the instant replay starting address; and
   demultiplexing the one or more retrieved media units into compressed video and audio data for respective delivery to the video and audio decompression engines.

2. The method of claim 1 wherein the memory is organized in a circular manner; and
   wherein when the memory is full, the oldest media unit stored in the memory is overwritten by the next media unit to be stored.

3. The method of claim 2 wherein the table is organized in a circular manner similar to the memory; and
   wherein when the oldest media unit stored in the memory is overwritten, the oldest starting address in the table is overwritten by the starting address corresponding to the next media unit to be stored in the memory.

4. The method of claim 1 wherein the number of media units to be retrieved pursuant to the instant replay command is configurable.

5. The method of claim 1 wherein the number of media units to be retrieved pursuant to the instant replay command depends on number of times an instant replay function key is pressed.

6. The method of claim 1 wherein the memory includes a dynamic random access memory.

7. The method of claim 1 wherein the memory includes removable media including one of a compact flash, a memory stick, a USB (universal serial bus) flash drive and a micro drive.

8. The method of claim 1 wherein the memory includes one of a hard disk or a semiconductor or magnetic media based randomly accessible storage device.

9. The method of claim 1 wherein the demultiplexed, compressed video and audio data are decompressed by the video and audio decompression engines and rendered into a portion of the program; and
   wherein the portion is played back in a first display and the program is concurrently played in real time in a second display.

10. The method of claim 9 wherein the first display is a full screen and the second display is a picture-in-picture window.

11. The method of claim 9 wherein the portion and the program are toggled between the first and second displays.

12. The method of claim 1 wherein the one or more of the plurality of media units are retrieved from the memory in a linear manner.

13. The method of claim 1 wherein the video compression engine and the audio compression engine support either constant bit rate or variable bit rate.

14. The method of claim 1 wherein the fixed duration for the plurality of media units is roughly about one (1) second.

15. A method for providing instant replay, the method comprising:

receiving a compressed and multiplexed audio/video stream from a file stored in a memory;

demultiplexing the audio/video stream into a compressed audio stream and a compressed video stream;

forming a plurality of logical media units based on the compressed audio and video streams, wherein each logical media unit includes at least one video frame and at least one corresponding audio frames, wherein each logical media unit includes a first video frame that is independently decodable, wherein each logical media unit is an independently decodable entity, and wherein the plurality of logical media units have roughly the same duration;

storing timestamp information and a plurality of starting addresses in a table, wherein each of the plurality of starting addresses corresponds to one of the plurality of logical media units, and wherein the first video frame of each of the plurality of logical media units is associated with corresponding timestamp information;

forwarding the compressed audio and video streams respectively to an audio decompression engine and a video decompression engine;

playing a program in real time, wherein the program is rendered from outputs generated respectively by the audio and video decompression engines;

identifying an instant replay starting address from the table in response to receipt of an instant replay command;

retrieving one or more of the plurality of logical media units from the memory starting with the logical media unit associated with the instant replay starting address; and demultiplexing the one or more retrieved logical media units into compressed video and audio data for respective delivery to the video and audio decompression engines.

16. The method of claim 15 wherein the number of logical media units to be retrieved pursuant to the instant replay command is configurable.

17. The method of claim 15 wherein the number of logical media units to be retrieved pursuant to the instant replay command depends on number of times an instant replay function key is pressed.

18. The method of claim 15 wherein the memory is a local or network storage device.

19. The method of claim 15 wherein the memory includes a dynamic random access memory.

20. The method of claim 15 wherein the memory includes removable media including one of a compact flash, a memory stick, a USB (universal serial bus) flash drive and a micro drive.

21. The method of claim 15 wherein the memory includes one of a hard disk or a semiconductor or magnetic media based randomly accessible storage device.

22. The method of claim 15 wherein the demultiplexed, compressed video and audio data are decompressed by the video and audio decompression engines and rendered.

23. The method of claim 15 wherein the method supports either constant bit rate or variable bit rate.

24. The method of claim 15 wherein the fixed duration for the plurality of logical media units is roughly about one (1) second.

* * * * *